United States Patent Office 3,809,632
Patented May 7, 1974

3,809,632
PROCESS FOR PHOTOCHEMICAL AND THERMAL PRODUCTION OF COBALT COMPLEXES
Giacomo Costa and Giovanni Mestroni, Trieste, Italy, assignors to Snam Progetti S.p.A., Milan, Italy
No Drawing. Continuation of abandoned application Ser. No. 814,854, Apr. 9, 1969. This application June 7, 1971, Ser. No. 150,803
Int. Cl. B01j 1/10; C07f 15/06
U.S. Cl. 204—158 R    2 Claims

ABSTRACT OF THE DISCLOSURE

An improved process is disclosed for preparing compounds of the formula R'COCo(III) salen by reacting RCo(III) salen with carbon monoxide and an active hydrogen compound R'H, wherein R is alkyl and R' is oxyalkyl, said reaction being effected under ultraviolet radiation and in the presence of oxygen.

---

This application is a continuation of Ser. No. 814,854 filed Apr. 9, 1969, now abandoned.

In our prior application for patent, Ser. No. 705,906, filed Feb. 16, 1968 now Pat. No. 3,567,751 issued Mar. 2, 1971 and having a common assignee, a process was disclosed for adding small unsaturated molecules and active hydrogen compounds, to organometallic Co(III) complexes with polydentate chelatin gagents having the formula:

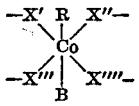

wherein X', X", X''' and X'''' may be carbon, oxygen, phosphorous, sulfur atoms and the like and wherein R is an alkyl, aryl, cycloalkyl or alkylaryl radical and B, when present is a Lewis Base as, water, amines, phosphines or ethers. The small unsaturated molecule is preferably carbon monoxide.

It has now been found that in the presence of $O_2$ the reaction rate is remarkably increased.

More specifically the present invention relates to a process for preparing an organometallic Co(III) complex of the formula:

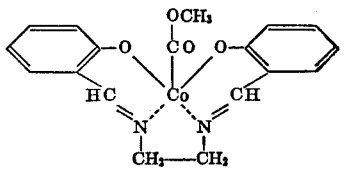

by reacting an organometallic Co(III) complex of the formula:

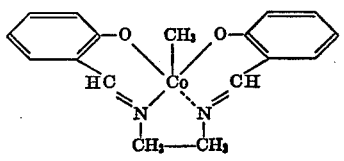

with carbon monoxide and methanol, the reaction being effected in the presence of ultraviolet radiation; the improvement which consists of carrying out said reaction in an oxygen or free oxygen containing gaseous atmosphere.

Oxygen may be added to the reactants, for instance it is possible to employ a carbon monoxide-oxygen mixture or the reaction may be carried out in the presence of air.

The following example illustrates the invention but is not limitative thereof.

EXAMPLE 500 mg. of $CH_3Co$ salen $H_2O$ (salen=bis-salycilaldehydeethylen diiminate) dissolved in 200 ml. of methyl alcohol were injected in a glass reactor. The solution was saturated with carbon monoxide and air and lighted with a mercury-vapor lamp for 5 hours. Thereafter the solution was concentrated under vacuum to a volume of 50 ml. and 100 ml. of water were added thereto.

Yellow-orange crystals precipitated (98%). The obtained product was identical with an authentic sample of $CH_3OCOCo$ salen $H_2O$.

What is claimed is:

1. In the process for preparing an organometallic Co(III) complex of the formula:

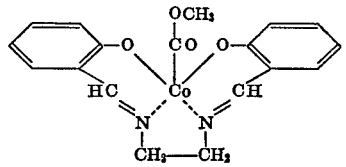

by reacting an organometallic Co(III) complex of the formula:

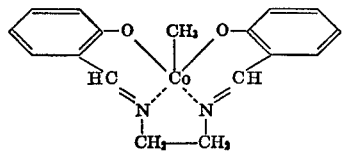

with carbon monoxide and methanol, the reaction being effected in the presence of ultraviolet radiation; the improvement which consists of carrying out said reaction in an oxygen or free oxygen containing gaseous atmosphere.

2. The process according to claim 1 wherein said resulting Co(III) complex is joined to water by the subsequent addition of water.

References Cited

UNITED STATES PATENTS 3,567,751    3/1971    Costa et al. _____ 260—439 R

DANIEL E. WYMAN, Primary Examiner

A. P. DEMERS, Assistant Examiner

U.S. Cl. X.R.

204—158 HE; 260—439 R